US012666258B2

(12) United States Patent
Hsu et al.

(10) Patent No.: US 12,666,258 B2
(45) Date of Patent: Jun. 23, 2026

(54) ACCESS-POINT CORRELATION FOR FAST CLIENT TRANSITIONS

(71) Applicant: Ruckus IP Holdings LLC, Claremont, NC (US)

(72) Inventors: Wei-Sheng Hsu, San Jose, CA (US); Shailesh Gupta, Bangalore (IN); Mayank Sourabh, Bengaluru (IN); Kesheva Murthy Kuradahalli Siddanayaka, Bengaluru (IN); Weichih Huang, New Taipei City (TW); Kuan-Hsun Peng, Taipei City (TW)

(73) Assignee: Ruckus IP Holdings LLC, Horsham, PA (US)

( * ) Notice: Subject to any disclaimer, the term of this patent is extended or adjusted under 35 U.S.C. 154(b) by 167 days.

(21) Appl. No.: 18/680,959

(22) Filed: May 31, 2024

(65) Prior Publication Data

US 2024/0406721 A1      Dec. 5, 2024

Related U.S. Application Data

(60) Provisional application No. 63/470,549, filed on Jun. 2, 2023.

(51) Int. Cl.
H04W 12/041      (2021.01)
H04W 48/10      (2009.01)

(52) U.S. Cl.
CPC .......... H04W 12/041 (2021.01); H04W 48/10 (2013.01)

(58) Field of Classification Search
CPC ........... H04W 12/041; H04W 12/0431; H04W 48/10; H04W 36/08
See application file for complete search history.

(56) References Cited

U.S. PATENT DOCUMENTS

2006/0256763 A1* 11/2006 Nguyen .............. H04W 12/041
                                                                    370/338
2009/0116647 A1*  5/2009 Korus ................... H04L 63/064
                                                                    380/272
(Continued)

OTHER PUBLICATIONS

"IEEE Standard for Information technology—Local and metropolitan area networks—Specific requirements—Part 11: Wireless LAN Medium Access Control (MAC) and Physical Layer (PHY) Specifications Amendment 2: Fast Basic Service Set (BSS) Transition," IEEE Std 802.11r-2008, Jul. 15, 2008 (Year: 2008).*

*Primary Examiner* — Jeremy S Duffield
(74) *Attorney, Agent, or Firm* — Myers Bigel, P.A.

(57) ABSTRACT

During operation, an access point may receive, from an electronic device, a roaming request, where the electronic device is currently associated with a second access point. In response, the access point may broadcast a message in a network, which includes the access point and the second access point. Note that the message may include an L2 look-up message. In some embodiments, the message is only conveyed to the second access point via a router or a switch in the network. Then, the access point may receive, from the second access point, PMK information, where the second access point is included in a subset in the network with the access point. Next, based at least in part on the PMK information, the access point may generate a PMK for use during secure communication with the electronic device and may perform a fast BSS transition with the electronic device.

17 Claims, 8 Drawing Sheets

(56)  References Cited

U.S. PATENT DOCUMENTS

| | | | | |
|---|---|---|---|---|
| 2013/0196708 | A1* | 8/2013 | Narasimhan | .......... H04L 9/0827 |
| | | | | 455/525 |
| 2013/0305332 | A1* | 11/2013 | Narasimhan | ...... H04W 36/0038 |
| | | | | 726/7 |
| 2014/0023074 | A1* | 1/2014 | Mishra | .................... H04L 45/66 |
| | | | | 370/390 |
| 2015/0120864 | A1* | 4/2015 | Unnimadhavan | ... H04L 67/1008 |
| | | | | 709/217 |
| 2019/0020735 | A1* | 1/2019 | Joo | ........................ H04H 20/72 |
| 2022/0377554 | A1* | 11/2022 | Henry | .................. H04W 12/03 |

* cited by examiner

― 200

RECEIVE A ROAMING REQUEST
210

BROADCAST A MESSAGE
212

RECEIVE PMK INFORMATION
214

GENERATE A PMK
216

PERFORM A FAST BSS TRANSITION
218

STATION          AP1          AP2          AP3          CONTROLLER

CONNECT

AUTHEN.
REQUEST

L3 LOOKUP
MESSAGE

CORREL.

L2 LOOKUP
MESSAGE

L3
SESSION
INFO.

AUTHEN.
RESPONSE

L3 TRANS.
MESSAGE

CLEAN
SESSION
INFO. AND
HANDLE
HANDOVER

ASSOC.
REQUEST

SESSION-
MANAGER
UPDATE
MESSAGE

ASSOC.
RESPONSE

ACCESS-POINT CORRELATION FOR FAST CLIENT TRANSITIONS

CROSS REFERENCE TO RELATED APPLICATIONS

This application claims priority under 35 U.S.C. 119 (e) to U.S. Provisional Application Ser. No. 63/470,549, "Access-Point Correlation for Fast Client Transitions," filed on Jun. 2, 2023, by Wei-Sheng Hsu et al., the contents of which are herein incorporated by reference.

FIELD

The described embodiments relate to techniques for communication among access points in a subnet to enable a fast basic service set (BSS) transition by a client.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network.

A station (or a client) may transition from one access point to another (which is sometimes referred to as a 'BSS transition'). For example, when a station determines or is informed that its communication performance (such as the data rate or throughput) can be improved by transitioning from a current access point that the station is associated with to another access point, the station may perform a BSS transition.

Moreover, when the station uses secure communication with the current access point, the current access point may distribute the keys determined by the current access point during a four-way handshake with the station in accordance with IEEE 802.11r. This may subsequently enable a so-called 'fast BSS transition' to the other access point.

Notably, the current access point may generate a pairwise master key or PMK (which is sometimes referred to as the 'R0 key holder' or 'R0KH'). Moreover, the current access point may generate and distribute secondary PMKs to neighboring access points that are within radio-frequency range of the current access point. As was the case with the PMK in the four-way handshake the station may independently derive the secondary PMKs. (Note that a given secondary PMK is sometimes referred to as a 'R1 key holder' or 'R1KH.') When distributing the secondary PMKs, the current access point may include information that indicates that the current access point is the master access point in a wireless local area network (WLAN) for the station. Alternatively, the current access point may provide the information to a server (such as a cloud-based server) or an optional controller, where it may be subsequently accessed by one or more other access points. In some embodiments, however, the master identity is implicit to or is specified by the secondary PMKs, such as the so-called R1KHs (which are derived from the R0KH).

However, this intelligent sharing and caching of the information needed for secure communication (such as the secondary PMKs) increases the management overhead in the WLAN, and may be dependent on network connectivity and latency in the WLAN. Consequently, the intelligent sharing and caching of this information is often restricted to other access points that are adjacent to or proximate to the current access point (such as other access points that are withing radio-frequency range of the current access point). This limits the number of other access points that can perform a fast BSS transition with the station. When the station cannot perform a fast BSS transition with the other access point, a new PMK may need to be derived by the other access point, and the other access point may need to authenticate the station, which increases the time needed for the station to perform a BSS transition.

SUMMARY

An access point is described. This access point includes one or more interface circuits that communicates (e.g., using wired and/or wireless communication) with a second access point and an electronic device. During operation, the access point receives, from the electronic device, a roaming request, where the electronic device is currently associated with the second access point. In response to the roaming request, the access point broadcasts a message in a network, which includes the access point and the second access point. Then, the access point receives, from the second access point, PMK information, where the second access point is included in a subset in the network with the access point. Next, based at least in part on the PMK information, the access point generates a PMK for use during secure communication with the electronic device and performs a fast BSS transition with the electronic device.

Note that the message may include a Layer 2 (L2) look-up message. In some embodiments, the message is only conveyed to the second access point via a router or a switch in the network.

Moreover, before receiving the PMK information, the access point may establish access point-to-access point communication with the second access point. In some embodiments, the PMK information is received via a Layer 3 (L3) connection.

Furthermore, the access point may receive policy information and/or session information of the electronic device along with the PMK information. Additionally, the access point may generate the PMK based at least in part on the policy information and/or the session information.

In some embodiments, the access point performs the fast BSS transition without involving a controller of the access point or the second access point.

Note that the PMK information may include a secondary PMK of the electronic device. For example, the secondary PMK may include a R1KH. Moreover, the secondary PMK may be compatible with IEEE 802.11r.

Moreover, performing the fast BSS transition may include: receiving, from the electronic device, an association request; and providing, to the electronic device, an association response. In some embodiments, after associating with the electronic device, the access point provides, to the controller, an update to the session information.

Furthermore, the access point may provide a second message in the network. This second message may include an L3 lookup message, where the L3 lookup message is provide to a second subnet in the network that does not include the access point and the second access point.

In some embodiments, where the electronic device is currently associated with a third access point in the second (different) subnet than the access point, the access point may not receive a response to the message in the second subnet (e.g., a timeout interval is exceeded). When this occurs, the access point may handle the transition of the electronic device via the controller.

Another embodiment provides the second access point.

Another embodiment provides the electronic device.

Another embodiment provides a computer-readable storage medium for use with the access point, the second access point or the electronic device. This computer-readable storage medium may include program instructions that, when executed by the access point, the second access point or the electronic device, cause the access point, the second access point or the electronic device to perform at least some of the aforementioned operations.

Another embodiment provides a method. This method includes at least some of the operations performed by the access point, the second access point or the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
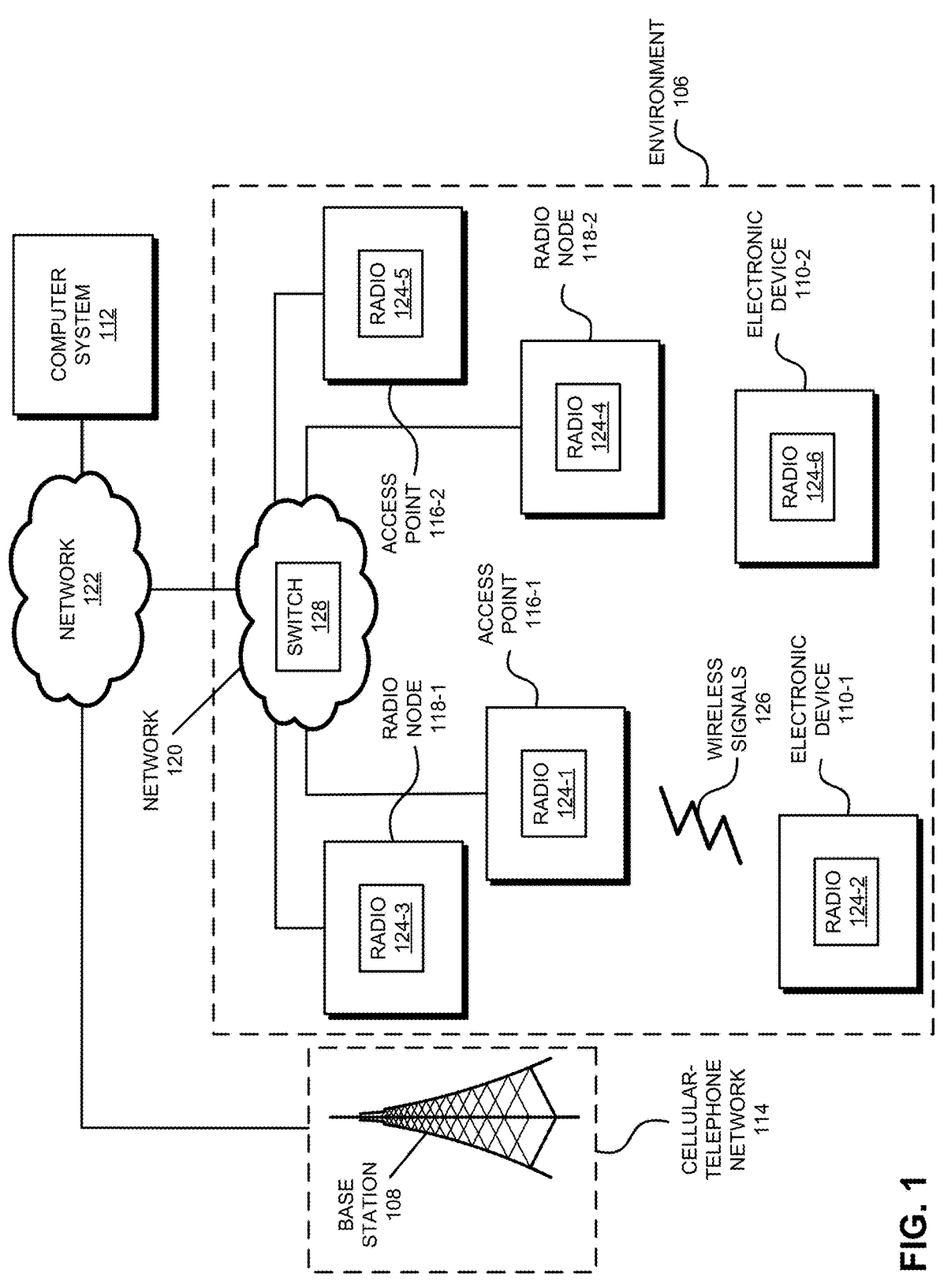
FIG. 1 is a block diagram illustrating an example of a system in accordance with an embodiment of the present disclosure.

An access point is described. During operation, an access point may receive, from an electronic device, a roaming request, where the electronic device is currently associated with a second access point. In response to the roaming request, the access point may broadcast a message in a network, which includes the access point and the second access point. Note that the message may include an L2 look-up message. In some embodiments, the message is only conveyed to the second access point via a router or a switch in the network. Then, the access point may receive, from the second access point, PMK information, where the second access point is included in a subset in the network with the access point. Next, based at least in part on the PMK information, the access point may generate a PMK for use during secure communication with the electronic device and may perform a fast BSS transition with the electronic device.

By receiving the PMK information selectively from the second access point, these communication techniques may enable the access point to perform the fast BSS transition without undue complexity or network constraints. For example, the access point may not receive the PMK information in advance of the roaming request. Moreover, the PMK information may not need to be provided in advance by the second access point. Furthermore, the access point may be outside of radio-frequency range of the second access point. Additionally, a controller of the access point and the second access point may not need to be involved in the fast BSS transition. These capabilities may reduce the management overhead in the network, and may reduce a dependence of the communication techniques on network connectivity and latency. Consequently, the communication techniques may allow the access point to perform the fast BSS transition, which may improve the ease of use and may provide an improved user experience.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or optional computer system 112 (which may include one or more computers, and which may be a local or cloud-based controller that manages and/or configures access points 116, radio nodes 118 and/or switch 128, or a cloud-based computer system that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 8:
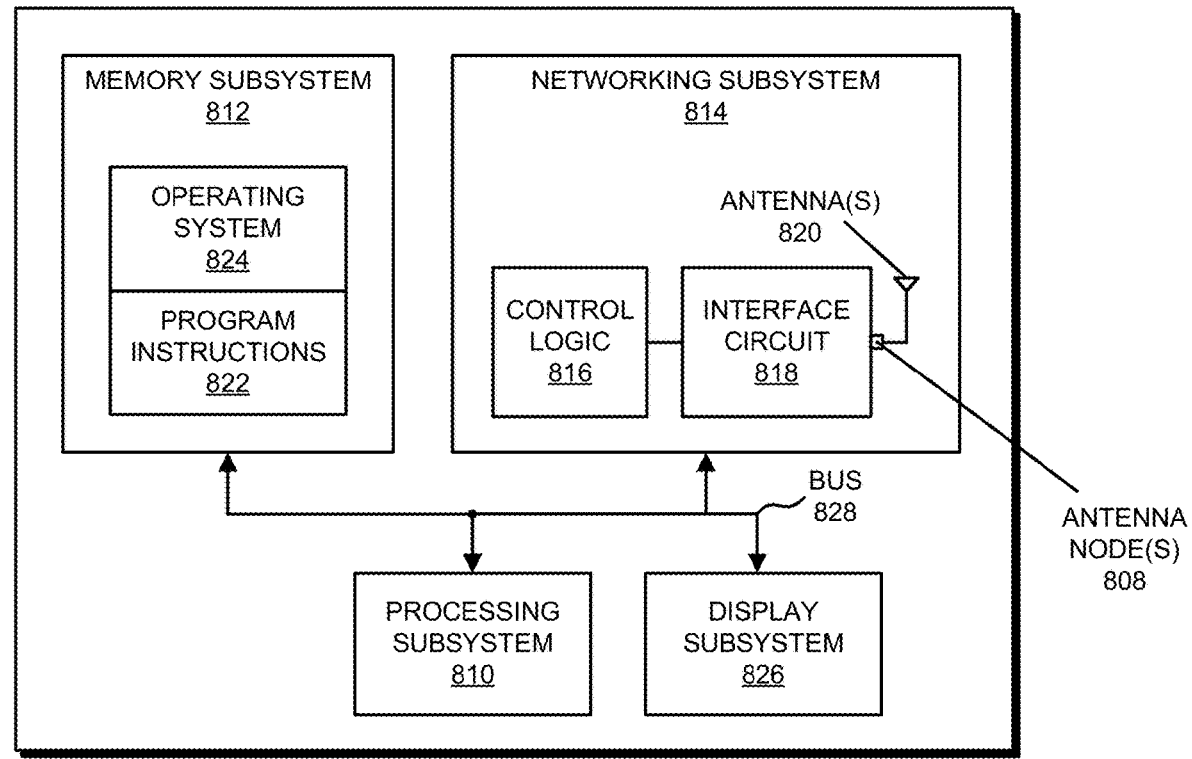
FIG. 8 is a block diagram illustrating an example of an electronic device in accordance with an embodiment of the present disclosure.

As described further below with reference to FIG. 8, electronic devices 110, computer system 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHZ, 2.4 GHZ, 5 GHZ, 6 GHZ, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple input, multiple output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be time-consuming or complicated for an electronic devices (such as electronic device 110-1) to roam between access points 116 (such as access points 116-1 and 116-2. In order to address these problems, as described below with reference to FIGS. 2-7, access points 116 may perform the communication techniques.

Notably, access point 116-2 may receive, from electronic device 110-1, a roaming request, where electronic device 110-1 is currently associated with access point 116-1. In response to the roaming request, access point 116-2 may broadcast a message in a network, which includes access points 116-1 and 116-2. Note that the message may include an L2 look-up message. In some embodiments, access point 116-2 may provide a second message in the network. This second message may include an L3 lookup message, where the L3 lookup message is provide to a second subnet in the network that does not include access points 116-1 and 116-2.

After receiving the message (e.g., directly or after selective forwarding by a router or switch 128 in the network), access point 116-1 may provide information to access point 116-2. This information may include: PMK information, policy information (such as authentication information in the network for electronic device 110-1), and/or session information (such as a current connection or association of electronic device, e.g., with access point 116-1, a subnet in the network that includes access points 116-1 and 116-2, etc.). In some embodiments, before providing the information, access point 116-1 may establish access point-to-access point communication with access point 116-2. This access point-to-access point communication may include an L3 connection. Consequently, in some embodiments, the information is provided between access points 116-1 and 116-2 via the L3 connection.

Moreover, after receiving the information, access point 116-2 may use at least some of the information (such as the PMK information) to generate a PMK for use during secure communication with electronic device 110-1. Note that the PMK information may include a secondary PMK of the electronic device. For example, the secondary PMK may include a R1KH. Moreover, the secondary PMK may be compatible with IEEE 802.11r.

Then, access point 116-2 may perform a fast BSS transition with electronic device 110-1. Note that access point 116-2 may perform the fast BSS transition without involving a controller (such as computer system 112) of access point 116-1 and/or access point 116-2. For example, performing the fast BSS transition may include: receiving, from electronic device 110-1, an association request; and providing, to electronic device 110-1, an association response. In some embodiments, after associating with electronic device 110-1, access point 116-2 may provide, to the controller (such as computer system 112), an update to the session information. The controller may disseminate the updated session information, e.g., in the subnet.

In these ways, the communication techniques may enable fast BSS transitions without undue complexity or network constraints. For example, access point 116-2 may be able to perform the fast BSS transition without involving the controller (such as computer system 112) and/or without a dependence on latency or network connections in the network. Consequently, the communication techniques may faster and simpler roaming, and thus may provide an improved user experience.

While the preceding discussion illustrated the communication techniques with electronic device 110-1 currently associated with access point 116-1, in some embodiments electronic device 110-1 is currently associated with a third access point in the second (different) subnet than access point 116-1. In these embodiments, access point 116-2 may not receive a response to the message in the second subnet (e.g., a timeout interval is exceeded). When this occurs, access point 116-2 may handle the transition of electronic device 110-1 via the controller (such as computer system 112).

In the described embodiments, processing a frame or a packet in a given one of the one or more access points 116 or a given one of the one or more electronic devices 110 may include: receiving wireless signals 126 with the frame or packet; decoding/extracting the frame or packet from the received wireless signals 126 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 116, the one or more electronic devices 110 and/or computer system 112. As another example, in another embodiment, different electronic devices are transmitting and/or receiving frames or packets.

Figure 2:
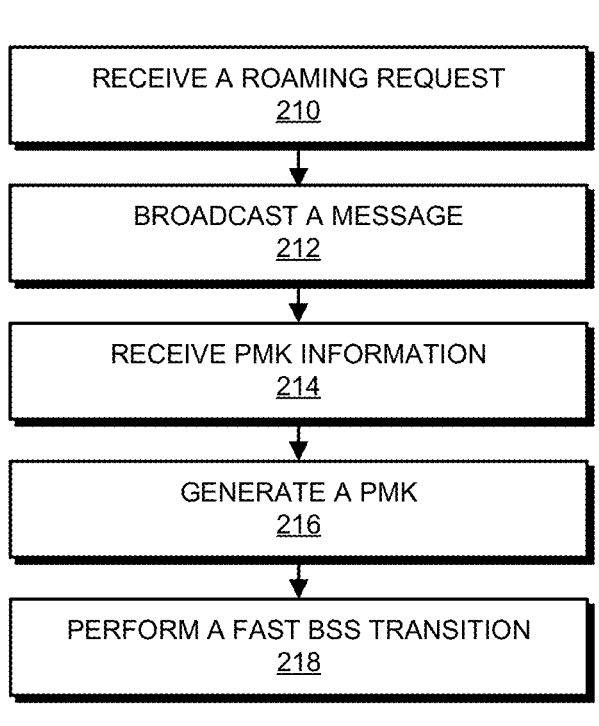
FIG. 2 is a flow diagram illustrating an example method for performing a fast basic service set (BSS) transition in the system in FIG. 1 in accordance with an embodiment of the present disclosure.

We now describe embodiments of the method. FIG. 2 presents an example of a flow diagram illustrating an example method 200 for performing a fast BSS transition. Moreover, method 200 may be performed by an access point, such as one of the one or more access points 116 in FIG. 1, e.g., access point 116-2.

During operation, the access point may receive, from an electronic device, a roaming request (operation 210), where the electronic device is currently associated with a second access point. In response to the roaming request, the access point may broadcast a message (operation 212) in a network, which includes the access point and the second access point. Then, the access point may receive, from the second access point, PMK information (operation 214), where the second access point is included in a subset in the network with the access point. Next, based at least in part on the PMK information, the access point may generate a PMK (operation 216) for use during secure communication with the electronic device and may perform the fast BSS transition (operation 218) with the electronic device.

Note that the message may include an L2 look-up message. In some embodiments, the message is only conveyed to the second access point via a router or a switch in the network.

Moreover, the access point may receive policy information and/or session information of the electronic device along with the PMK information. Furthermore, the access point may generate the PMK based at least in part on the policy information and/or the session information.

Furthermore, the access point may perform the fast BSS transition without involving a controller of the access point or the second access point.

Note that the PMK information may include a secondary PMK of the electronic device. For example, the secondary PMK may include a R1KH. Moreover, the secondary PMK may be compatible with IEEE 802.11r.

In some embodiments, the access point may optionally perform one or more additional operations (operation 218). For example, before receiving the PMK information, the access point may establish access point-to-access point communication with the second access point. In some embodiments, the PMK information is received via an L3 connection and/or may be compatible with IEEE 802.11r.

Moreover, performing the fast BSS transition may include: receiving, from the electronic device, an association request; and providing, to the electronic device, an association response. In some embodiments, after associating with the electronic device, the access point provides, to the controller, an update to the session information.

Furthermore, the access point may provide a second message in the network. This second message may include an L3 lookup message, where the L3 lookup message is provide to a second subnet in the network that does not include the access point and the second access point.

In some embodiments, where the electronic device is currently associated with a third access point in the second (different) subnet than the access point, the access point may not receive a response to the message in the second subnet (e.g., a timeout interval is exceeded). When this occurs, the access point may handle the transition of the electronic device via the controller.

In some embodiments of method 200, there may be additional or fewer operations. Moreover, there may be different operations. Furthermore, the order of the operations may be changed, and/or two or more operations may be combined into a single operation.

Figure 3:
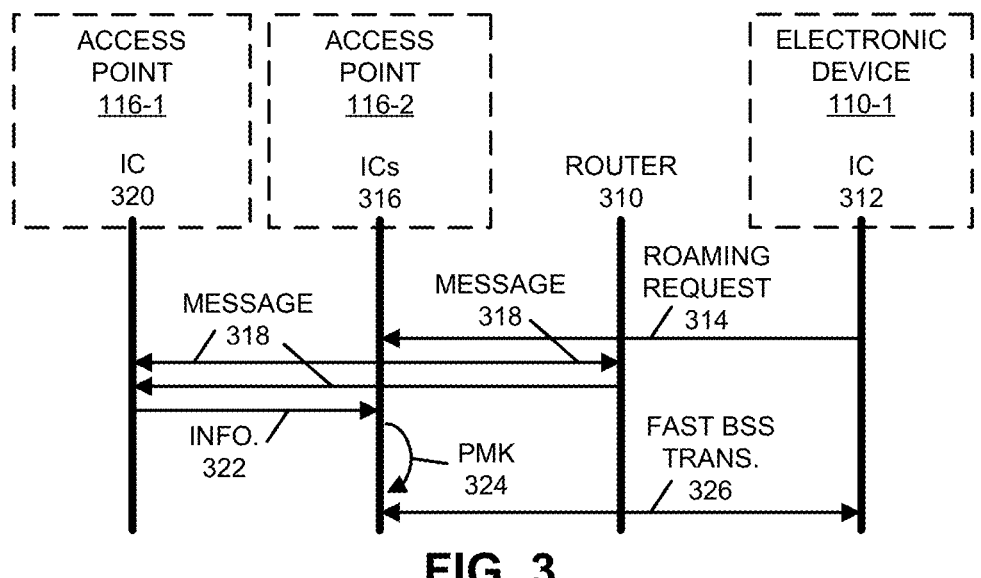
FIG. 3 is a drawing illustrating an example of communication among electronic devices in FIG. 1 in accordance with an embodiment of the present disclosure.

FIG. 3 presents a drawing illustrating an example of communication among access point 116-1, access point 116-2, router 310 (or a switch) and electronic device 110-1. In FIG. 3, an interface circuit (IC) 312 in electronic device 110-1 may provide, to access point 116-2, a roaming request 314. This roaming request may be received by at least one of one or more interface circuits 316 in access point 116-2. Note that electronic device 110-1 may be currently associated with access point 116-1.

In response to roaming request 314, at least one of the one or more interface circuits 316 may broadcast a message 318 in a network. Note that the network may include access points 116-1 and 116-2.

Router 310 may optionally receive and may selectively forward message 318 to access point 116-1. Note that router 310 may be aware of the current association between access point 116-1 and electronic device 110-1 via session information that is shared (e.g., by a controller) in the network. Alternatively, access point 116-1 may receive message 318 from access point 116-2. Note that access point 116-1 may be included in the same subnet in the network as access point 116-2.

After at least one of one or more interface circuits 320 in access point 116-1 receives message 318, at least one of the one or more interface circuits 320 may provide information 322 (such as PMK information, policy information and/or session information) to access point 116-1. This information may be received by at least one of the one or more interface circuits 316.

Based at least in part on the PMK information, the one or more interface circuits 316 may generate a PMK 324 for use during secure communication with electronic device 110-1. Then, at least one of the one or more interface circuits 316 may perform a fast BSS transition 326 with electronic device 110-1.

While FIG. 3 illustrates some operations using unilateral or bilateral communication (which are, respectively, represented by one-sided and two-sided arrows), in general a given operation in FIG. 3 may involve unilateral or bilateral communication.

We now further describe the communication techniques. The communication techniques may provide more accurate correlation of an access-point location in a wireless network with reduced effort and less intrusion to the service. Notably, at least some related access points may be coupled or connected within a subnet to allow information used for a fast BSS transition to be distributed more efficiently. These communication techniques may be applicable to access-point neighbor discovery, inter-access-point communication, and the transport of connectivity information during a station handoff.

In the communication techniques, an access point may handle a session transition completely in the local network. Therefore, fast roaming or a fast BSS transition may be achieved between access points without the intervention or involvement of a controller of the access points. These capabilities may allow fast BSS transitions or roaming and may be scalable in large network deployments.

In existing roaming techniques, R1KHs may be formed by neighboring access points based on wireless scans. Moreover, the roaming hit rate may not be guaranteed. Furthermore, the active push of the PMK toward the electronic devices that have the R1KHs may increase the load and network traffic from the electronic devices that has the R0KH. For example, the keepalive messages between electronic devices that have the R0KH and the R1KHs may increase the load and network complexity. Additionally, the R0KH load and the number of electronic devices with the R1KHs may keep increasing as stations roam. Consequently, scaling of the existing roaming techniques may be challenging.

Moreover, existing wireless networks may not have a standard way to determine access-point spatial correlation. Typically, spatially correlation of access points may be determined using wireless scans and by accordingly building neighboring access-point lists. However, because of radio-frequency characteristics, it is often difficult to control this process and obtained a desired accuracy. Furthermore, the wireless scans usually impact the service or performance. This is exacerbated in dense deployments.

In the disclosed communication techniques, connectivity-oriented access-point correlation is used to tune wireless system from the perspective of a station and without difficulties. The resulting correlation is usually more accurate and dynamically adaptive to real deployment and station demand that existing approaches.

For example, the fast BSS transitions enabled by the communication techniques can solve radio-frequency-based roaming issues. These communication techniques may build up accurate access point-to-access point communication channels, so that a fast BSS transition during a session of a station can be guaranteed within the radio-frequency coverage domain of an access point. In some embodiments, the session information of the station (which may enable a fast BSS transition) may only be transmitted when a destination access point is in a same subnet as a current access point.

In the communication techniques, roaming by a station may be tracked and two related access points may be spatially correlated or associated at a given time.

In some embodiments, the communication techniques are implemented using a so-called split-media access control (MAC) architecture. In this architecture, real-time or time-sensitive MAC functions (such as beacon generation, probe transmission and response, and control frame processing, e.g., Request to Send or RTS and Clear to Send or CTS) are performed at an access point, and non-real time or time-insensitive MAC functions (such as authentication, de-authentication, association, reassociation, bridging between Ethernet and a WLAN, fragmentation, etc.) are performed by a controller. This architecture may provide a context from the controller to use to recognize when a station is roaming. Alternatively, in the local MAC architecture, an access point may need to store station context and the present (external) access-point information. In these embodiments, the other access point may perform lookups whenever a station attempts to connect to recognize station roaming. This correlation process may be performed at runtime or offline, but may consume significant access-point resources.

The use of the MAC architecture may allow an access point to obtain information of a station (e.g., the session information may include session context, barring user equipment, a dynamic preshared key (DPSK) cache, etc.) from its neighboring access point, to which the station is previously connected during the roaming. This approach may perform better and may provide more accurate access-point neighbor correlation by tracking the roaming trail of the station, and this may result in accurate access point-to-access point communication coverage and a higher roaming success rate. The existing system implementation may also be improved to support a pull model based at least in part on the session information. This may include the ability to directly derive R1KH from the session information, even when R1KH has not yet been pushed to the target or destination access point. Note that active R1KH pushing may also be optimized based at least in part on the pull model and accurate access point-to-access point communication coverage.

In some embodiments, the communication techniques may partially use an L2 network as the access point-to-access point communication bus to boost the communication efficiency. The station session may be retained on the last connected or associated access point. Moreover, in some embodiments the communication techniques may use a pull model for fast BSS transitions and session transitions. Note that access-point neighbor correlation may use station roaming to increase accuracy.

The use of the L2 network may solve most of the issues that occur with wireless-scan based access-point discovery. Notably, an access point-to-access point communication channel may be formed when a station attempts to roam. Eventually, this approach may result in accurate access point-to-access point communication coverage based at least in part on the radio-frequency coverage of an access point and the perspective of a station.

Figure 4:
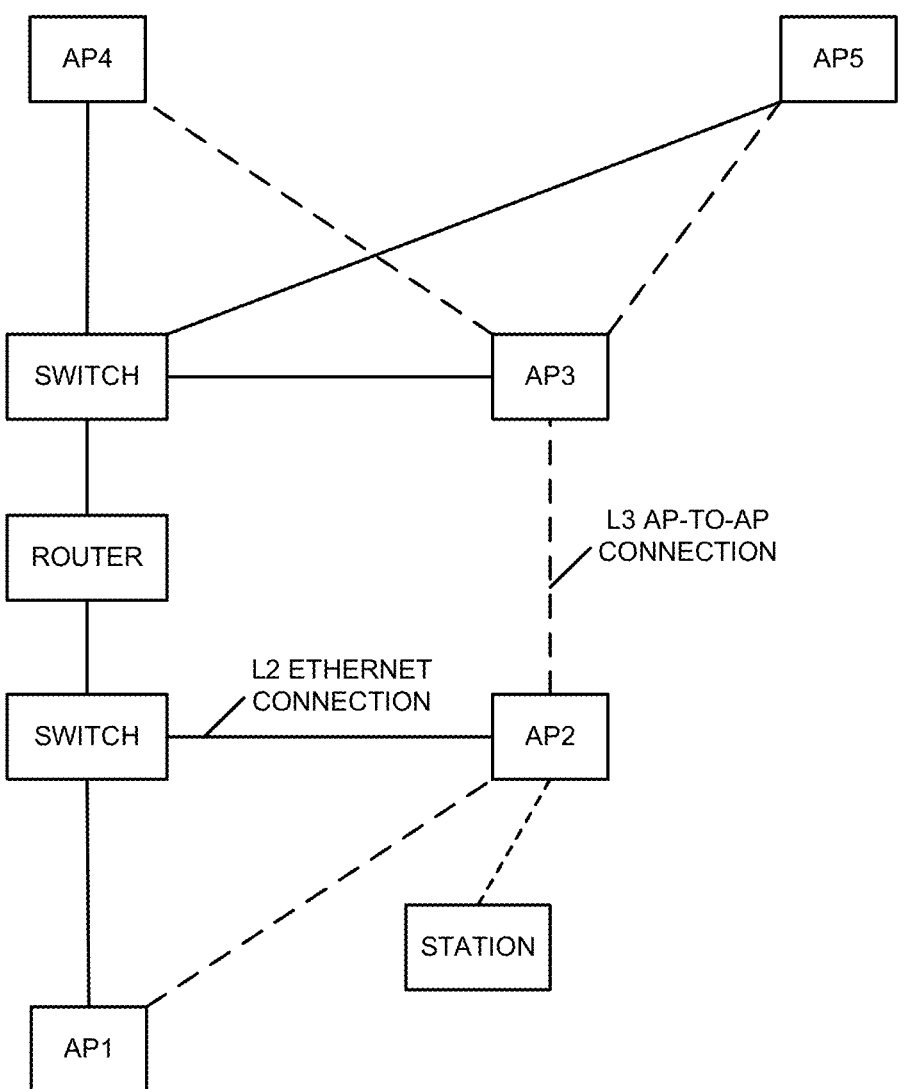
FIG. 4 is a drawing illustrating an example of a fast BSS transition in a network in accordance with an embodiment of the present disclosure.

We now describe a fast BSS transition using the communication techniques. FIG. 4 presents a drawing illustrating an example of a fast BSS transition in a network. This implementation may occur on the access point, and thus may be controller agnostic (indeed, it may be independent of the controller). In FIG. 4, note that the statin is current connected or associated with access point 1 (AP1) and the roaming or target access point may be access point 2 (AP2).

In FIG. 4, the station may roam from access point 1 to access point 2 using an authentication request. In response, access point 2 may send a lookup message to L2 and L3 neighbors in different subnets. In some embodiments, access point 2 may provide an L3 lookup message to access point 3 (AP3). Note that there may be L2 Ethernet connections between access points and routers and switches in FIG. 4.

Access point 1 may correlate access point 2 as its neighbor and may reply or send session information back to access point 2 using an L3 access point-to-access point connection. Moreover, access point 2 may continue to station connectivity with the station. Notably, access point 2 may send a transition message to the station. Then, access point 1 may clean session information and handle aspects of the handover, such as accounting.

In these embodiments of the communication techniques, there are multiple messages that may be communicated. Notably, the lookup messages may, depending on the subnet, be sent out in L2 broadcast and L3 unicast via access point-to-access point communication channels to solicit the access point that currently has the session information for the station. Moreover, the transition message may be sent in L3 unicast via the access point-to-access point communication channel by the current connected access point (access point 1) after the station connects with the target access point (access point 2).

In this session transition scenario, the access point-to-access point communication channel may be established to let the previously connected access point (access point 1)

send the session information for the client back to the target access point (access point 2). If the preceding session-transition message fails, note that the session transition may be managed by a session manager in the controller as a failover mechanism.

Figure 5:
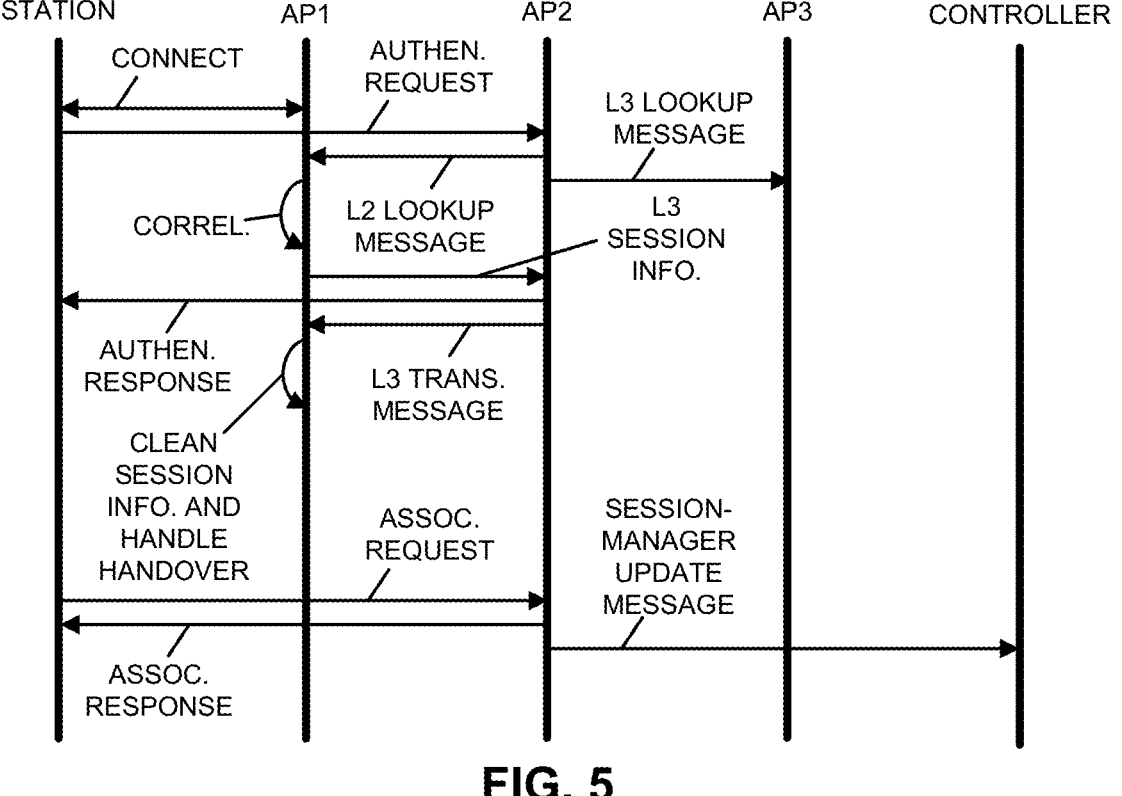
FIG. 5 is a drawing illustrating an example of communication among electronic devices in FIG. 4 in accordance with an embodiment of the present disclosure.

FIG. 5 presents a drawing illustrating an example of communication among electronic devices. Notably, the station may first connect or associate with access point 1. Then, the station may provide an authorization request to access point 2. Access point 2 may broadcast an L2 lookup message, which may be received by access point 1. Access point 1 may correlate access point 2 as a neighboring access point. Moreover, access point 1 may provide an L3 session-information message to access point 2. Next, access point 2 may provide an authorization response to the station. Furthermore, access point 2 may provide an L3 transition message to access point 1. In response, access point 1 may clean the session information and may handle the handover. Additionally, the station may provide an association request to access point 2. Access point 2 may provide an association response to the station. In some embodiments, access point 2 may provide a session-manager update message to a controller.

Thus, the communication techniques may use context to enable a fast BSS transition even when access points are not immediate neighbors. The fast BSS transition may allow access point 2 and the station to skip authentication operations.

Note that the use of a lookup message in L2 broadcast may simplify the overall design. Notably, the target access point may be able to guarantee the delivery of lookup message to the access points within the same subnet. Note that the target access point may have already sent a broadcast logical ink control (LLC) frame (which is sometimes referred to as an 'L2UF' frame) when the station tried to connect. Consequently, sending another (small packet size) broadcast frame will not cause further issue. For example, a 1500 byte payload broadcast at 1 Gbps Ethernet line speed will use a rate of 82,345 frames per second. In some embodiments, the access point may send two L2UF frames and one lookup frame. Consequently, in theory, the access points in the same subnet will be able to process 82,345 frames/3 or 27,448 frames per second.

The access points and other computer network devices (such as switches and routers) in the network may implement a kernel module that filters out the lookup messages if the station is not currently connected or associated with a given access point or computer network device. This may mitigate the broadcast implications for the user-space application on each access point or computer network device.

Note that the lookup message may be sent using L2 broadcast in a subnet and using L3 unicast via access point-to-access point communication channels for its neighboring access points in a different subnet. There may be a 100 ms holding time for the target access point to wait for the lookup response. Otherwise, the session-manager-based session transition on the controller may be used to perform or coordinate the BSS transition. The transition message may be sent after the station connects with the target access point, e.g., using L3 unicast via an access point-to-access point communication channel. The target access point may have to wait for a transition response in order to obtain statistics about the handover if a single session identifier accounting feature is turned on or enabled. Furthermore, there may be be other metadata handover-like application visibility and control (AVC) flows triggered by an internal roaming event on the previously connected or associated access point (access point 1).

Figure 6:
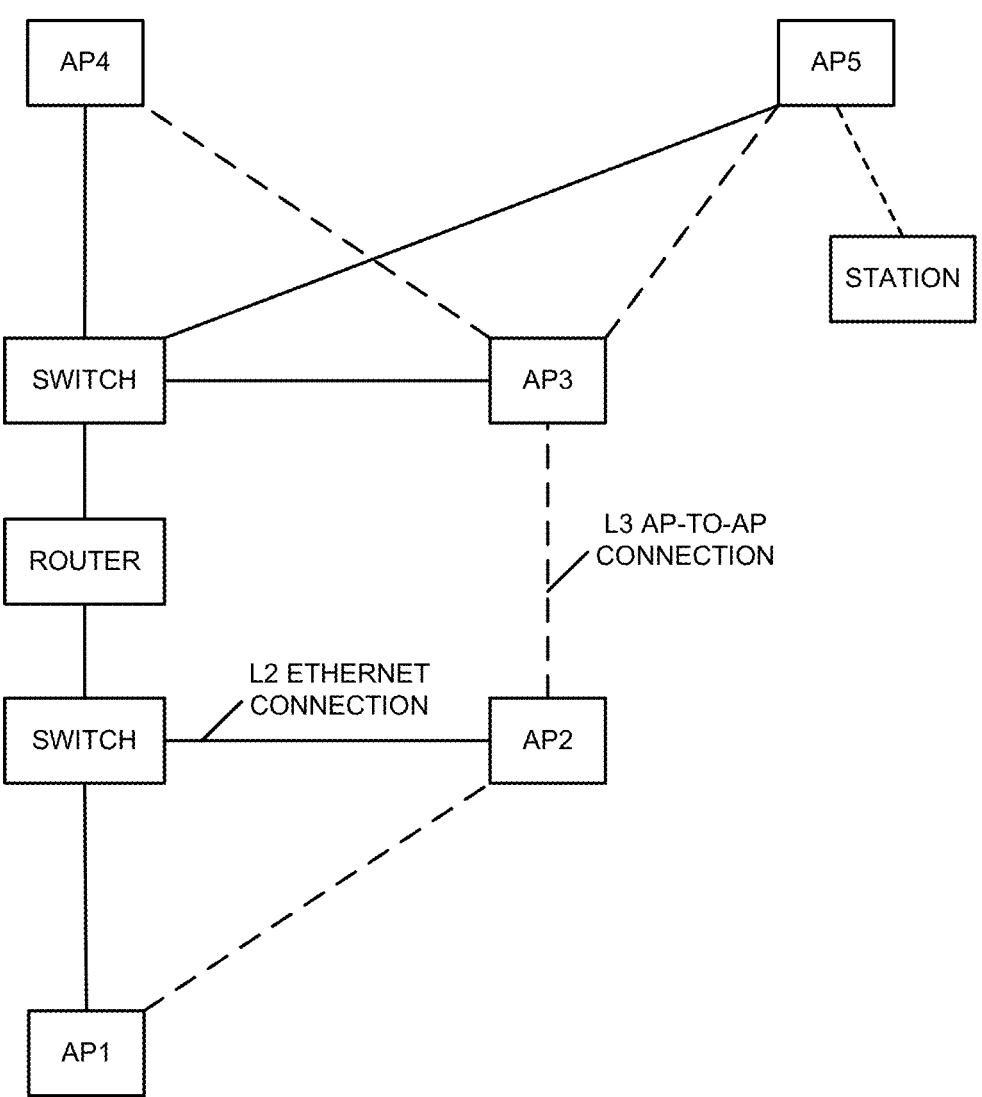
FIG. 6 is a drawing illustrating an example of a BSS transition in a network in accordance with an embodiment of the present disclosure.

We now describe roaming to a non-neighbor access point. In these embodiments, the session manager on the controller may operate as the failover mechanism. FIG. 6 presents a drawing illustrating an example of a BSS transition in a network. In FIG. 6, the current connected or associated access point is access point 2 (AP2) and the target (roaming) access point is access point 5 (AP5). Because the attempted BSS transition or session transition occurs between two access points in different subnets, the BSS transition may fail (because there is no access point-to-access point communication channel between these access points).

Notably, a station may attempt to roam from access point 2 to access point 5 by sending an authorization request. In response, access point 5 may perform a fast BSS transition process, and it may fail. Consequently, access point 5 may send a lookup message to a session manager in a controller and it may reply session information back to access point 5. Then, access point 5 may continue to station connectivity and may correlate access point 2 as its neighbor if it is not there. Moreover, access point 5 may send a transition message to the session manager. Next, access point 2 may clean session information and may handle other handover details, such as accounting.

Figure 7:
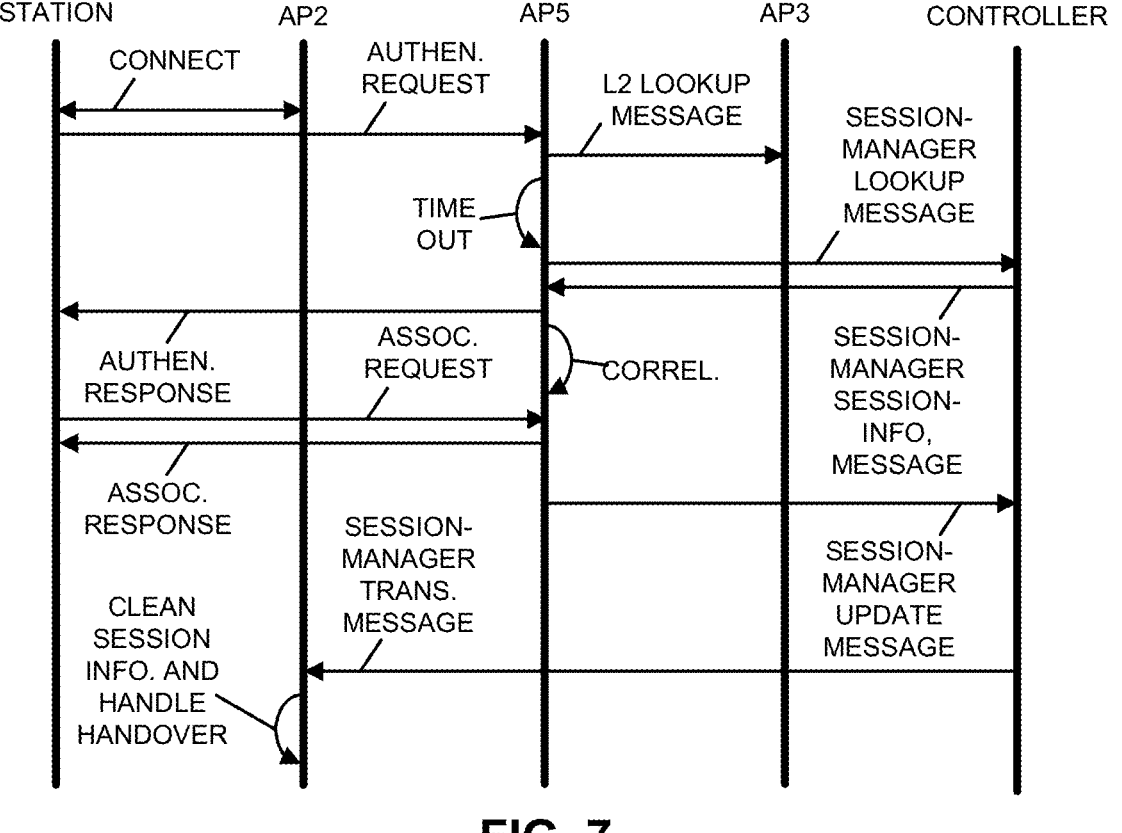
FIG. 7 is a drawing illustrating an example of communication among electronic devices in FIG. 6 in accordance with an embodiment of the present disclosure.

FIG. 7 presents a drawing illustrating an example of communication among electronic devices. Notably, a station may first connect or associate with access point 2. Then, the station may provide an authorization request to access point 5. In response, access point 5 may broadcast an L2 lookup message to access point 3. A timeout may occur on the fast BSS or session transition. Next, access point 5 may provide a session-manager lookup message to a controller. The controller may provide a session-manager session information message to access point 5. Moreover, access point 5 may provide an authentication response to the station. Access point 5 may correlate access point 2 as its neighbor access point. Furthermore, the station may provide an association request to access point 5. Access point 5 may provide an association response to the station. Additionally, access point 5 may provide a session-manager update message to the controller. The controller may provide a session-manager transition message to access point 2. Access point 2 may clean the session information and may handle the handover.

In these embodiments of a session transition, the access point-to-access point communication channel may be established based at least in part on a session-manager-based session transition. Stated differently, the access point-to-access point communication channel may have to be established with a wireless scan-based neighbor access-point discovery prior to the roaming by the station.

In summary, the disclosed communication techniques may address roaming issues (such as PMK cache, opportunistic key caching or OKC, fast BSS transitions, etc.) with an active Wi-Fi connection. It may increase survivability and may mitigate network problems during roaming.

We now describe embodiments of an electronic device, which may perform at least some of the operations in the communication techniques. For example, the electronic device may: base station 108, one of electronic devices 110, computer system 112, one of access points 116, one of radio nodes 118, and/or switch 128. FIG. 8 presents a block diagram illustrating an electronic device 800 in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, ASICs, microcontrollers, programmable-logic devices, graphical processor units (GPUs) and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory (which collectively or individually are sometimes referred to as a 'computer-readable storage medium'). In some embodiments, instructions for processing subsystem 810 in memory subsystem 812 include: one or more program modules or sets of instructions (such as program instructions 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more antenna nodes, such as nodes 808, e.g., a pad or connector, which can be coupled to the one or more antennas 820. Thus, electronic device 800 may or may not include the one or more antennas 820.) For example, networking subsystem 814 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 800 may be adapted or changed using pattern shapers (such as reflectors) in one or more antennas 820 (or antenna elements), which can be independently and selectively electrically coupled to ground to steer the transmit antenna radiation pattern in different directions.

Thus, if one or more antennas 820 includes N antenna-radiation-pattern shapers, the one or more antennas 820 may have 2 different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting frames and/or scanning for frames transmitted by other electronic devices.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 814 or electronic device 800. The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 822, operating system 824 (such as a driver for interface circuit 818) or in firmware in interface circuit 818. Alternatively or additionally, at least some of the operations in the communication techniques may be implemented in a physical layer, such as hardware in interface circuit 818.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHZ, 2.4 GHz, 5 GHz, 60 GHz, and/or a band of frequencies used by a Citizens Broadband Radio Service or by LTE. In some embodiments, the communication between electronic devices uses multi-user transmission (such as OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
one or more interface circuits configured to communicate with a second access point and an electronic device, wherein the one or more interface circuits are configured to:
receive, from the electronic device, a roaming request, wherein the electronic device is currently associated with the second access point;

broadcast, in response to the roaming request, a message comprising a Layer 2 (L2) look-up message in a network that comprises the access point and the second access point;

receive, from the second access point, pairwise master key (PMK) information in response to the L2 look-up message, wherein the PMK information is received via a Layer 3 (L3) connection, wherein the access point and the second access point are included in an L2 subnet of the network; and generate, based at least in part on the PMK information, a PMK for use during secure communication with the electronic device and perform a fast basic service set (BSS) transition with the electronic device, wherein the L2 look-up message is a broadcast frame transmitted within the L2 subnet to identify which access point in the L2 subnet is currently associated with the electronic device and holds the PMK information for the electronic device.

2. The access point of claim 1, wherein the message is only conveyed to the second access point.

3. The access point of claim 1, wherein, before receiving the PMK information, the one or more interface circuits are configured to establish access point-to-access point communication with the second access point.

4. The access point of claim 1, wherein the one or more interface circuits are configured to receive, from the second access point and along with the PMK information, policy information of the electronic device, session information of the electronic device, or both.

5. The access point of claim 4, wherein the one or more interface circuits are configured to generate the PMK based at least in part on the policy information, the session information, or both.

6. The access point of claim 1, wherein the one or more interface circuits are configured to perform the fast BSS transition without involving a controller of the access point or the second access point.

7. The access point of claim 1, wherein the PMK information comprises a secondary PMK of the electronic device.

8. The access point of claim 7, wherein the secondary PMK comprises an R1 key holder (R1KH).

9. The access point of claim 7, wherein the secondary PMK is compatible with Institute of Electrical and Electronics Engineers (IEEE) 802.11r.

10. The access point of claim 1, wherein performing the fast BSS transition comprises:
receiving, from the electronic device, an association request; and
providing, to the electronic device, an association response.

11. The access point of claim 1, wherein, after associating with the electronic device, the one or more interface circuits are configured to provide, to a controller of the access point, an update to session information of the electronic device.

12. The access point of claim 1, wherein the one or more interface circuits are configured to provide a second message in the network.

13. The access point of claim 12, wherein the second message comprises a Layer 3 (L3) lookup message, and wherein the L3 lookup message is provided to a second subnet in the network that does not include the access point and the second access point.

14. A method for performing a fast basic service set (BSS) transition, comprising:

by an access point performing operations comprising:

receiving, from an electronic device, a roaming request, wherein the electronic device is currently associated with a second access point;

broadcasting, in response to the roaming request, a message comprising a Layer 2 (L2) look-up message in a network that comprises the access point and the second access point;

receiving, from the second access point, pairwise master key (PMK) information in response to the L2 look-up message, wherein the PMK information is received via a Layer 3 (L3) connection, wherein the access point and the second access point are included in an L2 subnet of the network; and generating, based at least in part on the PMK information, a PMK for use during secure communication with the electronic device and performing the fast BSS transition with the electronic device, wherein the L2 look-up message is a broadcast frame transmitted within the L2 subnet to identify which access point in the L2 subnet is currently associated with the electronic device and holds the PMK information for the electronic device.

15. The method of claim 14, wherein the fast BSS transition is performed without involving a controller of the access point or the second access point.

16. A method for performing a fast basic service set (BSS) transition by a first access point in a network, the method comprising:

receiving, from an electronic device, a roaming request, wherein the electronic device is currently associated with a second access point, and wherein the first access point and the second access point are in an L2 subnet of the network;

broadcasting, in response to the roaming request, a message comprising a Layer 2 (L2) look-up message only to the second access point and a router that are in the L2 subnet of the network;

receiving, from the second access point, pairwise master key (PMK) information in response to the L2 look-up message, wherein the PMK information is received via a Layer 3 (L3) connection; and generating, based at least in part on the PMK information, a PMK for use during secure communication with the electronic device and performing the fast BSS transition with the electronic device, wherein the L2 look-up message is a broadcast frame transmitted within the L2 subnet to identify which access point in the L2 subnet is currently associated with the electronic device and holds the PMK information for the electronic device.

17. The method of claim 16, wherein the fast BSS transition is performed without involving a controller associated with the first access point or the second access point.

* * * * *